United States Patent [19]

Funk

[11] Patent Number: 5,721,779
[45] Date of Patent: Feb. 24, 1998

[54] APPARATUS AND METHODS FOR VERIFYING THE IDENTITY OF A PARTY

[75] Inventor: Paul Funk, Cambridge, Mass.

[73] Assignee: Funk Software, Inc., Cambridge, Mass.

[21] Appl. No.: 520,155

[22] Filed: Aug. 28, 1995

[51] Int. Cl.$^6$ ...................................................... H04K 1/00
[52] U.S. Cl. ............................................... 380/23; 380/30
[58] Field of Search .................................. 380/23, 24, 25, 380/28, 30

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,376,299 | 3/1983 | Rivest . |
| 4,405,829 | 9/1983 | Rivest et al. . |
| 4,633,036 | 12/1986 | Hellman et al. . |
| 4,658,093 | 4/1987 | Hellman . |
| 4,995,082 | 2/1991 | Schnorr . |
| 5,144,667 | 9/1992 | Pogue, Jr. et al. . |

OTHER PUBLICATIONS

Schneier, B., *Applied Cryptography*, John Wiley & Sons, Inc., New York, Foreward pp. xi–xvii.; Ch. 1, pp. 1–3; Ch. 14, pp. 321–324, 329–333, (1994).

*Primary Examiner*—David C. Cain
*Attorney, Agent, or Firm*—Lahive & Cockfield, LLP

[57] ABSTRACT

Apparatus for verifying the identity of a party are disclosed, the apparatus including a database memory that stores a password signal encrypted by operation of a one-way commutative function; a number generator that generates an non-repeating number or signal representative thereof; and a processor element that can generate a challenge signal as a function of the number signal and a selected one-way commutative function and that can further generate a key signal as a function of the encrypted password signal and the number. The system includes a communication port for transmitting the generated challenge signal to a party requesting access to the secure system and for receiving a response from the party; and further includes a comparator element for comparing the received response with the generated key signal and for generating a match signal that indicates whether the response signal received from the party is substantially identical to the encrypted password signal stored in the database memory.

28 Claims, 4 Drawing Sheets

APPARATUS AND METHODS FOR VERIFYING THE IDENTITY OF A PARTY

FIELD OF THE INVENTION

This invention relates generally to data processing systems and methods that prevent unauthorized access to a restricted area or a device, and more particularly, to data processing systems and methods that employ passwords to verify the identity of a party requesting access to a restricted area or device.

BACKGROUND OF THE INVENTION

Security systems commonly employ passwords to verify the identity of a party seeking access to a restricted device or area. Commonly, the restricted device is a computer system, such as a file server, that contains classified or other valuable information. Typically these security systems include a database memory for storing a list of valid passwords, typically indexed before users names, a communication interface that allows a party to transmit a password into the system, and a comparator element that compares the password entered by the party with the stored list of valid passwords. A match between the offered password and one of the known valid passwords verifies the identity of the party. Alternatively, a failure to match the offered password with any known valid password causes the security system to deny access to the party.

Generally, these security systems work well to protect communications between a client and sewer. However, the effectiveness of these security systems is predicated upon maintaining the secrecy of all valid passwords. The secrecy of passwords is subject to breach by at least three methods of attack. In a first method, an interloper breaches security by gaining access to the database memory that contains the stored passwords. The interloper can then capture a valid password and employ the captured password to gain entry to the server. In a second method of attack an eavesdropper taps into a communication channel that carries data, including valid passwords, between the system and a client. Eventually, the eavesdropper can capture a valid password and employ this password to access the server. In a third method of attack, an impostor, posing as the security system, dupes an unwitting system client into presenting a valid password. The presented password can be captured, often without the client ever becoming aware of the deception, and the impostor can gain access to the sewer by presenting the captured password.

In response to this first weakness, cryptographers developed password security systems that have an encryption mechanism for encrypting passwords. The system encrypts the passwords and stores the encrypted passwords in the system database memory. Typically, the encryption mechanism employs a one way digest function, such as the MD5 digest, to encode each valid password and stores each encoded password in the system database. Consequently, even if an interloper gains access to the database memory, the passwords are securely encoded and system integrity is maintained. An example of one password security method is the password authentication protocol (PAP) which provides link security under the point-to-point protocol (PPP) as defined by the Internet Engineering Task Force (IETF). PAP verifies the password offered by a client who requests access to the system. According to this protocol, the system performs the one way digest on each password offered by a client, and compares the digest of the offered password against each encoded password in the system database. If a match occurs, the system grants the client access to the server. Alternatively, if no match occurs, the system denies the client access to the server and the server remains protected.

For such a system to work, the client must communicate the password in clear text to the server. Thus, even if the database is secure, the communication port may include an unsecured channel, such as a telephone line, that an eavesdropper can tap and monitor to capture a password as it is transmitted by the client. If an eavesdropper can capture a valid password, the eavesdropper can present the password to the security system, which will digest the offered password for comparison with the stored encrypted passwords. Once the security system finds a match, the system grants the eavesdropper access to the server and security is breached.

In response to this problem, cryptographers developed security systems that employ a transmission encryption scheme to secure a public communication channel. Generally, these techniques implement a challenge, response and handshake authentication method. An example of challenge, response and handshake method is the challenge and handshake authentication protocol (CHAP) defined under the PPP set forth by the IETF. Under CHAP, the system issues a challenge to a client requesting access. The challenge can be a random number of a certain length, i.e. a certain number of bits. The client typically answers the challenge by performing a one-way function, e.g., a digest, on the random number and on the client's password. The client transmits the result of this operation back to the system. The system then performs the same one-way function on the random number and on its stored copy of the password (or on each of a number of stored copies of potential passwords). If the system finds a match between the response of the client and the result of its operation with a valid password, the system grants access to the client. If no match is found, the client is denied access.

As apparent from the foregoing, systems employing a challenge, response and handshake technique secure the communication channel by carrying passwords in an encrypted format. Accordingly, these systems prevent an eavesdropper from capturing a valid password. However, security systems that employ these techniques are required to maintain a database of plain text passwords to allow the system to check the validity of the response signal sent by the client. Therefore, these systems are at risk of breach by an interloper who gains access to this database of passwords.

Accordingly, an object of this invention is to provide systems and methods that authenticate the identity of a party and that provide both a secure database of stored passwords and a secure communication channel for transferring passwords.

Still another object of the present invention is to provide systems and methods for authenticating the identity of a party that allows a user to more easily change their password.

These and other objects will become apparent in the description below.

SUMMARY OF THE INVENTION

The invention, in one aspect, provides a method that allows a client to transfer his or her password to a server, while maintaining the secrecy of the client's password. To aid in understanding the following description, certain terms are defined below. These definitions are not limiting and are only provided to aid in describing the invention recited by the claims.

The term "client", as used herein, encompasses a device or a person and a device that is requesting access to a secure system. For example, a client can be a person having a portable computer and who is trying to establish a telecommunication link with a secure computer network over a pubic communication path such as a telephone line. Furthermore, the term client can describe a device or a person and a device in which the device communicates by a direct connection or by a wireless exclusive link, such as an optical or IR link, to a security system that controls and restricts the device's access to information, files, areas, privileges, commands and other system rights.

The term "server", as used herein, encompasses a device that is capable of establishing a communication link with a second device for transmitting, receiving or exchanging information with that second device. As one example, the term server encompasses an access point on a computer network that is adapted to establish a network link, via a telecommunications channel, with a remote workstation. Moreover, the term server can encompass devices, such as network file servers, that are adapted to control and restrict a workstation's access to files, information and system rights.

The term "security system", as used herein, can encompass a device or a method that enforces link security for the communication link between the client and the server.

The term "authentication value", as used herein, encompasses a signal that is an encrypted representation of a data value, where the data value is secret. Typically the secret data value is a user password, and accordingly, the authentication value can be a value employed by the system to authenticate the identity of a user.

The term "one-way function", as used herein, is generally understood, within the art of cryptography, to be a mathematical function F(x, y), where z=F(x, y) and given (x) and (y) it is easy to compute (z), however, given x and z it is infeasible to compute y. A one-way function is generally considered to be infeasible to invert if the economic cost for determining the operands of the function is greater than the economic value of the information achieved by the inversion. As a practical matter a function can be considered infeasible to invert if the inversion process requires greater than $10^{30}$ operations.

The term "commutative one-way function" as used herein, is generally understood within the art of cryptography to be a one-way function that exhibits the commutative property. Thus, if F( ) is a one-way function, F( ) is deemed to be a commutative one-way function if:

$$F(F(x, y), z) = F(F(x, z), y).$$

The term "non-repeating number", as used herein, encompasses a number, i.e. a numeric value defined by one or more digits, that occurs in a sequence of numbers, which is unlikely to contain any pair of matching numbers. There will, in general, be some limit to the length of a sequence that can be assumed to contain non-repeating numbers.

The term "random number", as used herein, encompasses a number, i.e. a numeric value defined by one or more digits, that occurs within a sequence of numbers having no specific pattern, such that the probability of any number appearing has no easily determined relationship to the history of the sequence up to that point, making it difficult to predict subsequent numbers from any point in the sequence. Provided that the appearance of any particular number has a sufficiently low probability, a random number sequence is also a non-repeating number sequence. Accordingly, all references to non-repeating numbers herein shall be understood to be able to include random numbers.

The method of the invention employs a challenge and response handshake technique that allows a server to authenticate a client based on a password. To this end, the method includes the step of providing the server with a challenge signal generator, such as a number generator that generates numbers, or electrical signals representative of numbers. The method further includes the step of providing the system with a database of authentication values, or electrical signals representative of authentication values, where each authentication values corresponds to a valid password.

The system employs the challenge signal generator and the database to implement the handshake. Typically, the handshake technique begins when the client issues an access request to the server. Upon detection of the access request, the system transmits a challenge signal to the client. The system can generate the challenge signal by selecting a number from a number generator and by using the number to encrypt a base signal, G, by operation of a one-way commutative function, F( ). The challenge signal generator can include a number generator that generates a sequence non-repeating numbers, a sequence of random numbers, or any other sequence of numbers such that each access request is challenged by a substantially different, or unpredictable, challenge signal. The encrypted base signal is the challenge signal that the security system issues to the client. In one example, the system encrypts the base number by operation of a one-way commutative function that includes an exponential function modulo a prime number. This operation can be represented by:

$$C = F(G, a) = G^a \bmod q; \qquad \text{(Eq. 1)}$$

where (C) is the challenge signal, (a) is the selected number, (G) is the base number and (q) is a prime number. The base value G and the prime number q can be preconfigured numbers that are known by both the client and the server and that are used to generate every challenge signal. Alternatively, either one or both of these values can be separately generated for each password, or a series of passwords, and stored with the corresponding authentication values. The system retrieves and employs these stored values to generate the challenge signal for a client. The client can maintain stored copies of these values or the server can transmit these values with the challenge signal. Other modifications can be made without departing from the scope of the invention.

To answer this challenge, the client is required to generate a response signal that indicates that the client knows one valid password. The client can generate this response signal by employing the same one-way commutative function to encrypt the challenge signal, C, with one valid password. For the above example of an exponential function modulo a prime number, F( ), the correct response is the result of raising the challenge signal by the power of a numeric value representative of a valid password, modulo the prime number q. This operation can be represented by:

$$\text{Response} = F(C, \text{Password}) = C^{Password} \bmod q. \qquad \text{(Eq. 2)}$$

Alternatively, the Response can be written in expanded form as an exponential function of the base number G by the expression:

$$\text{Response} = F(F(G,a), \text{Password}) = ((G^a)^{Password} \bmod q). \qquad \text{(Eq. 3)}$$

The client generates the response signal and transfers it to the security system to complete the handshake. The system now verifies if the response indicates that the client knows a valid password. To verify the response, the system retrieves an authentication value from the authentication value database. Each authentication value in the database represents a password that has been encrypted by operation of the one-way commutative function employed by the system and the client. Consequently, each authentication value can be represented by:

$$\text{Authentication Value} = F(G, \text{Password}) = G^{Password} \bmod q; \quad \text{(Eq. 4)}$$

where (Password) is a password, or a numeric value representing a password, (G) is the base number and (q) is the prime number.

The system generates a key signal to compare the response with the retrieved authentication value. The system generates the key signal by raising the authentication value signal to a power determined by the selected number, a, and determining the modulus of the result relative to the prime number q. This operation can be represented by:

$$\text{Key} = F(F(G, \text{Password}), a) = ((G^{Password})^a \bmod q). \quad \text{(Eq. 5)}$$

Given the commutative property of the one-way function, the key signal of Eq. 5 will match the response signal if the password used by the client corresponds to the authentication value selected by the system. This equivalency can be expressed by:

$$\text{Key} = F(F(G, \text{Password}), a) = F(F(G, a), \text{Password}) = \text{Response}; \quad \text{(Eq. 6)}$$

or for the example function F( ):

$$\text{Key} = ((G^{Password})^a \bmod q) = ((G^a)^{Password} \bmod q) = \text{Response}. \quad \text{(Eq. 7)}$$

The system computes key signals from the authentication values and compares the key signals with the response signal until a match is found or until the entire database has been tested. If a match occurs, the system grants the client access. Alternatively, if the system fails to find any match in the database, the client has failed to meet the system's challenge and the system denies the client access to the server.

In a further aspect, the invention provides password security systems and devices that include encryption processors adapted to implement an encryption scheme that employs the commutative property of certain one-way mathematical functions. These systems allow a client and server to exchange a password over a public communication channel without compromising the secrecy of the password.

Generally, these systems include a communication port, an encryption processor and a challenge signal generator that typically comprises a non-repeating number generator. These elements perform the challenge and response method handshake described above. Each time a client requests access to the server, the communication port detects an access request signal and activates the encryption processor to generate a challenge signal. The encryption processor selects a number from the number generator and makes one copy for its use and one copy for the client requesting access. The encryption processor employs the non-repeating number to encrypt a base signal by operation of the one-way commutative function and the communication port transmits the encrypted number as a challenge signal to the client requesting access.

The client receives the challenge signal and employs it to generate a response signal. To this end the client includes a processor that generates the response, termed a logon signal, by encrypting the challenge signal with a password by operation of the one-way commutative function. One consequence of this technique is that the client generates a new response signal each time the client logs onto the server. In this way, the client changes the encrypted code of the password each time a response is transmitted over the communication channel. Consequently, the system prevents an eavesdropper on the public communication channel from capturing a bit stream of an encoded password which can be employed in a subsequent access request.

These systems further include a verification system that includes a database of authentication values, an encryption processor and a comparator element. The comparator element can couple to the communication port and can collect the response signal transmitted from the client. Once the comparator element has received the response signal, the encryption processor reads each authentication value from the database memory and encrypts that signal as a function of the selected non-repeating number. The processor transmits each encrypted authentication value to the comparator element for comparison with the response signal. A match between two signals indicates that each signal includes the same password and the same non-repeating number. The system responds to this match to verify the identity of the client.

More specifically, the above described system can include a memory element that stores one or more authentication values that each represent a valid password which has been encrypted by operation of a one-way commutative function. The system includes a processor element arranged to implement a selected one-way commutative function. Preferably the processor element is arranged to implement a one-way commutative function that includes an exponential-modulo function. The challenge signal generator can include a random number generator for generating a number in random sequence. The processor element can couple to the random number generator and to the memory element and, by operation of the selected one-way commutative function, generate a key signal that represents the authentication value encrypted as an exponential-modulo function of the generated random number signal and that further generates a challenge signal that represents a base signal encrypted as an exponential-modulo function of the random number signal. The system further includes a communication port for transmitting the challenge signal to a party requesting access through the system and for receiving a logon signal from the party that can include a password offered by the party. The system includes a comparator element that directly compares the logon signal with the key signal and that generates a match signal that represents a substantial identity between the key signal and the logon signal.

The system thus summarized is particularly useful for verifying the identity of a party requesting access to a secure computing system, such as a computer network file server. Furthermore, the above described system is useful for verifying the identity of a party requesting access to a computer network from a computer terminal that transmits data, including a password, over an unsecured communication channel, such as a telephone line. As described above, the system can include a database memory element that stores encrypted passwords in a format that is substantially incapable of decryption. Moreover, the commutative property of the one-way function allows identical signals to be generated by different sequences of the same operations. This property allows the system to transmit signals in an encrypted format and to compare directly two encrypted signals. Accordingly, this system achieves an apparatus that provides both a secure database memory element and a secure communication channel.

In a preferred embodiment of the present invention, the encrypted password signals are encoded according to an exponential function modulo a large prime number.

These and other aspects of the invention will become apparent in the following description, when the invention is described and illustrated in connection with the certain preferred embodiments; however, it should be clear that various additions, subtractions, and modifications can be made by those of ordinary skill in the art without departing from the scope of the present invention.

BRIEF DESCRIPTION OF THE DRAWINGS

A more complete understanding of the invention may be obtained by reference to the drawings, in which.

DESCRIPTION OF ILLUSTRATED EMBODIMENTS

Figure 1:
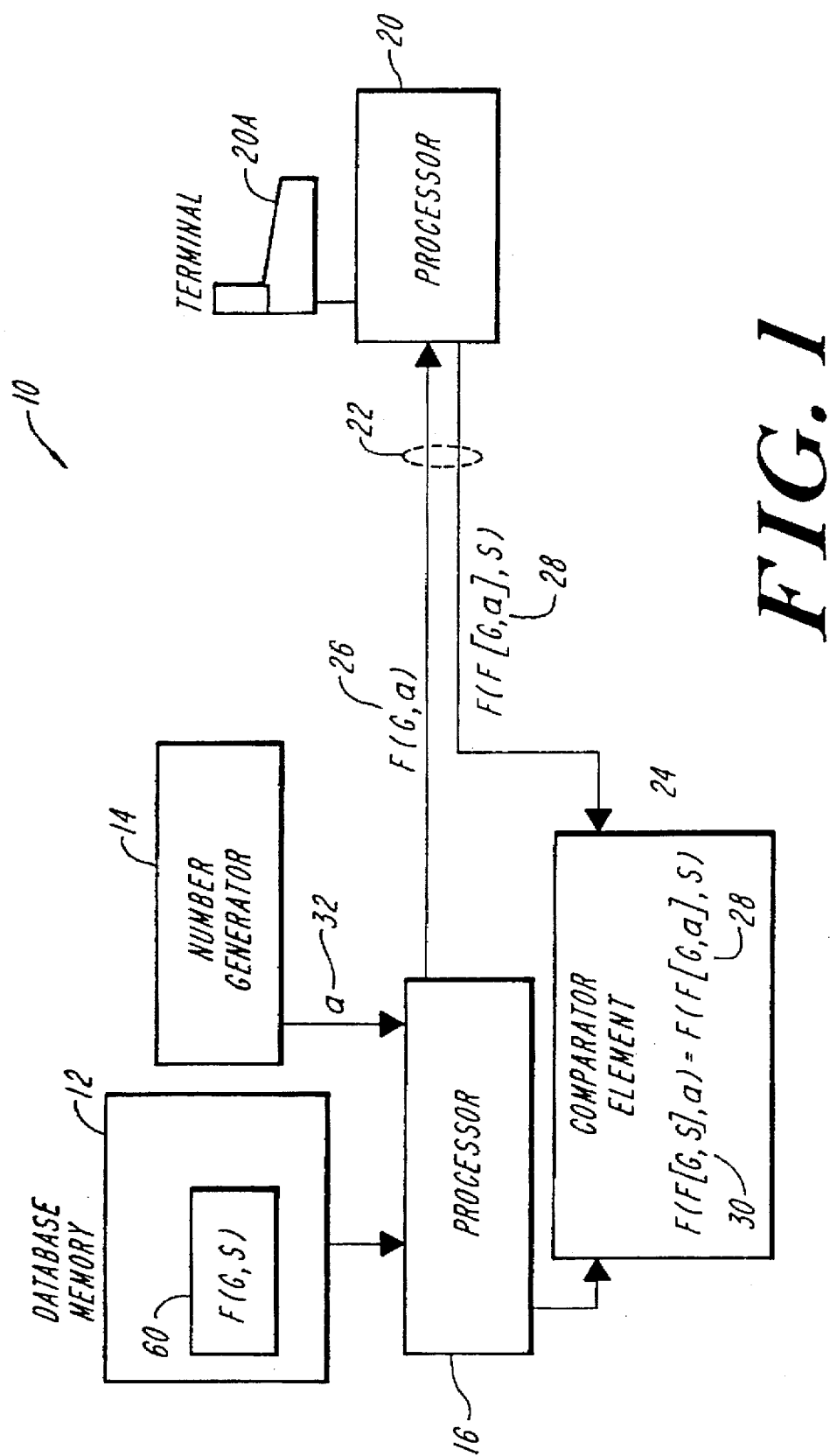
FIG. 1 is a functional block diagram of a password security system according to the invention.

FIG. 1 illustrates the functional components of a system 10 constructed according to the invention for transferring a password between a client and a server. The system 10 illustrated in FIG. 1 includes a database memory element 12, a challenge signal number generator 14, a processor element 16, and a processor element 20 connected to an optional terminal element 20A and to a communications channel 22 that couples the processor element 20 to both the processor element 16 and the comparator element 24.

The system 10 implements a challenge and response handshake protocol that employs a commutative one-way function to encrypt the signals that the client and server exchange. The system 10 employs the same one-way commutative function, F( ), to store in the database memory element 12 authentication values 60 that can represent encrypted passwords, or electrical signals representative of encrypted passwords. The password S is a valid password which is assigned to a user that is authorized to access the server. In the illustrated embodiment, the authentication value 60 is the password encoded into a format that is generally considered infeasible to invert. In a preferred embodiment of the invention, the password S is first randomized to reduce the system's susceptibility to a dictionary attack. In this preferred embodiment, a randomizing factor, U, is generated at the time the user selects a password P. The client or the server can generate the randomizing factor using any of the techniques known in the art of cryptography. The server can retain the randomizing factor U and employ this factor each time the user accesses the server, and can include this factor U as part of the challenge signal. Further, the client can retain the randomizing factor for randomizing the user-selected password each time a response is generated.

One preferred randomizing factor U can be a number of sufficient length, such as a 128 bit or larger number, generated by a random number generator and made available to a processor element that digests the factor U and the selected password S. In one embodiment of the invention, the processor implements the MD5 algorithm to digest a user selected password and generate a randomized password signal D(S, U). The system 10 employs the randomized password, D(S,U) rather than the password itself as an input to the commutative function to produce the authentication value 60.

$$S=D(P, U) \qquad \text{(Eq. 8)}$$

Where S is the randomized password, P is the password selected by the user and U is the randomizing factor.

In operation, the user can access the server by operating the terminal 20A. In particular, the user can enter his or her valid password into the terminal element 20A. The system processor element 16 can detect the request of the client, and generate a challenge signal 26 that the client must answer to access the server. In the illustrated embodiment, the system 10 generates the challenge signal 26 by accessing the authentication value 60 stored in the database memory 12 and by selecting a number 32, or a signal representative of a number. As illustrated by the functional block diagram of FIG. 1, the number 32 can be provided by the challenge signal number generator 14 that produces a number signal 32. The number generator 14 can be a random number generator, a non-repeating number generator, or any other suitable number generator. In the illustrated embodiment, the number 32 is a non-repeating number generated by a non-repeating number generator. The processor element 16 generates a challenge signal 26 for the client by encrypting a base signal, G, with the number signal 32 by operation of the selected one-way commutative function. The system 10 transmits the challenge signal 26 to the client.

To respond to the challenge signal 26, the client generates a response signal 28 that represents the challenge signal 26 encrypted with the client's password, S. The processor element 20 generates the response signal 28 by operation of the selected one-way commutative function. As illustrated in FIG. 1, the client transmits the response signal 28 to the comparator element 24. The system 10 generates a key signal 30 by encrypting the authentication value 60 with the non-repeating number 32 by operation of the commutative one-way function. To verify that the client has successfully met the challenge issued by the system, the comparator element 24 compares the key signal 30 with the response signal 28. If the comparator element detects a match between these two signals 30 and 28, the system 10 grants the client access to the server. Alternatively, if the key signal fails to match the response signal, the system 10 denies the client access to the server.

In a further alternative embodiment, the system 10 can include a processor 16 and a processor 20 that are adapted to implement a second randomizing operation that can add further security to the public communication channel. This second randomizing operation can include a response signal digest operation, such as an MD5 operation, that encrypts the response signal 28 to generate an encrypted response signal for transmission over a public communication channel. The server employs the same digest operation to encrypt the key signal 30 to generate an encrypted key signal and the comparator 24 compares these doubly encrypted signals. Both the client and the server can retain or exchange any common encryption keys or other data necessary for the selected digest operation. A match indicates that the client has met the server's challenge and the system 10 grants access to the client.

Figure 2:
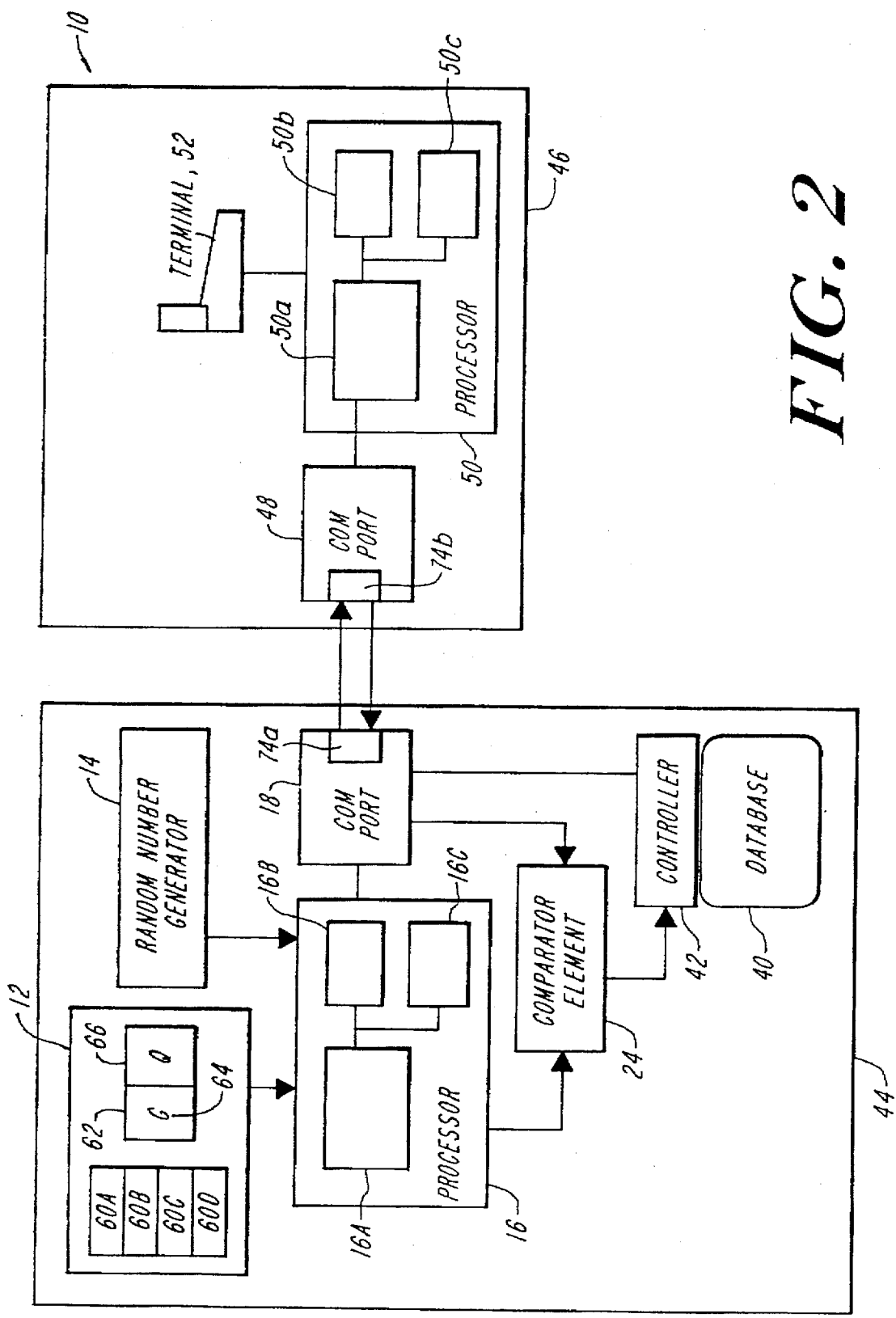
FIG. 2 schematically illustrates an alternative embodiment of a system in accord with the invention for verifying the identity of a party.

FIG. 2 illustrates one embodiment of the security system 10 constructed as part of a file server that has a database element 40 which stores files and other information. The file server is part of a host element 44 connected via a communication channel 22, to a client element 46. The illustrated host element 44 includes a memory element 12, a random number generator 14, a processor element 16, a communication port 18, a comparator element 24 and a database element 40 having a database control element 42. As depicted in FIG. 2, the client element 46 connects to the host element 44 via the communication channel 22 that connects between the communication port 18 and a communication port 48.

The system 10, depicted in FIG. 2, is arranged for transferring passwords in an encrypted format over a public communication channel such as the communication channel 22. In this aspect of the invention, the communication channel 22 represents an insecure communication channel such as a telephone line, computer network, or other non-secure communication link. To this end, the system 10, depicted in FIG. 2, includes the communication ports 18 and 48, the random number generator 14, the memory element 12 and the processors 16 and 50, all of which are arranged as a communication interface that transfers a password as part of a randomly generated signal. The randomly generated signal encodes a valid password in an encrypted format that is generally considered infeasible to invert. Further, this encrypted string is randomly generated each time a password is transferred over the public communication channel 22. Consequently, an interloper eavesdropping on the channel 22 can only capture the password as part of a generated string that is randomly produced for this single transfer. As such, the randomly encrypted value fails to provide general access to the system 10. From the above description, one of ordinary skill in the art is to recognize that the present invention can be practiced with a communication channel 22 that is generally considered secure against interlopers.

The database memory element 12, processor 16 and comparator element 24 form a verification system that can verify the identity of a party requesting access to the system by directly comparing the randomly encrypted value sent by the client 46 against a value generated by the processor 16. As such, the system 10 provides a verification system that can directly compare two signals, each of which can be in an encrypted format, to verify the identity of a party seeking access onto the system. Consequently, the system 10 can include the database memory element 12 that stores authentication values 60A–60D in an encrypted format that is generally considered infeasible to invert.

In the illustrated embodiment, the database memory 12 has storage registers for storing a plurality of authentication values 60A–60D. Each authentication value 60A–60D can represent a plain text password that has been encrypted into a cipher text format. As is generally known in the art of cryptography, plain text is information written in a format that is clearly understood in the present format. Alternatively, cipher text is a message or information written in a format not understood without changing the format of the information. In a preferred embodiment of the invention, the authentication value signals 60A–60D are encrypted according to a one-way commutative function that is infeasible to invert. Within the field of cryptography, a cipher signal is generally considered to be infeasible to invert if the cost as measured by either the amount of memory used or the computing time is finite but impossibly large, for example, on the order of approximately $10^{36}$ operations, with existing computational methods and equipment.

In the illustrated system 10, the memory element 12 includes a storage element 62 that can store a base signal 64 and a prime signal 66 that are suitable for use with a commutative one-way function that includes an exponential-modulo function. Such functions, which are well known within the art of cryptography, generally include a base signal, such as signal 64, that is raised to the power of a secure signal such as a password, and that is modulo a prime number, such as the prime number represented by signal 66. Generally, such functions are represented by $$C = G^s \bmod q \qquad \text{(Eq. 9)}$$

where (C) is the encrypted product of the operation, (G) is the base signal 64 and (q) is the prime number signal 66. The product C generated by these functions is generally considered infeasible to invert when the prime signal 66 is selected to be large. In one preferred embodiment of the invention, the prime number signal 66 is a large signal having on the order of 512 bits of information.

As further illustrated by FIG. 2, the host element 44 includes a processor element 16. The processor element 16 can be an electrical circuit card assembly having a CPU 16A, a program memory 16B and a data memory 16C. The CPU 16A can be a conventional microprocessor unit such as the type commonly used for processing digital data signals, the data memory 16C and the program memory 16B can be conventional computer memories such as the type commonly used for storing electrical digital data signals. The program memory 16B can store a program element that represents a series of instruction codes for operating the CPU 16A to generate signals as a function of the selected one-way commutative function. The program element further includes instruction code that instructs the processor element 16 to operate the communication port 18 and to retrieve data from the database memory 12.

The construction of the program element follows from principles and teachings generally known with the art of computer engineering and is considered within the scope of one or ordinary skill in the art. The construction of the processor element 16 can be carried out according to well known principles in the art of electrical engineering and computer engineering. Modifications, additions, and subtractions in the construction of the processing element 16 can be implemented with the present invention without departing from the scope thereof. Furthermore, it should be apparent to one of ordinary skill in the art of electrical engineering and computer engineering that each circuit assembly depicted in FIG. 2 can be implemented as a software module and that the software modules can be similarly interconnected in a computer program to implement the system 10 as an application program running on a conventional digital computer.

The processor element 16 is arranged for carrying out a one-way commutative function. In the embodiment illustrated in FIG. 2, the processor element 16 is arranged for generating signals according to the exponential-modulo operation described above. As illustrated in FIG. 2 the processor element 16 connects via transmission paths to the data memory element 12 and the number generator 14. The operating program element stored in the program memory 16B of the processor element 16 can instruct the CPU 16A to read the base signal 64 and the prime number signal 66 from the data memory 62 and to read a number signal 32 from the number generator 14. The illustrated processor element 16 stores each signal in the data memory 16C. The CPU 16A operates on the stored signals and implements a one-way commutative function of the random number signal 32. In one preferred embodiment of the invention, the program element instructs the processor unit 16A to generate the challenge signal 26 as an exponential-modulo function of the base signal 64, the prime signal 66 and the random number signal 32. In one embodiment of the present invention, the challenge signal 26 is generated according to the formula:

$$C = G^a \bmod q \qquad \text{(Eq. 10)}$$

where (C) is the challenge signal 26, (G) is the base signal 64, (a) is the random number signal 32 and (q) is the prime number signal 66. In this embodiment, the challenge signal 26 is the product of a commutative function. This product, challenge signal 26, can be transmitted via the communication ports 18 and 48 and the communication channel 22, to the client element 46. In an optional embodiment, a number generator can generate a base signal 64 and/or a prime number signal 66 for each authentication value 60 and stored with that value. The number generator can be a random number generator or any other conventional number generator. These values can be sent with the challenge signal to the client.

The client element 46 includes a processor 50 arranged for implementing the select one-way commutative function. The processor 50 includes a CPU 50A, a program memory 50B and a data memory 50C. The processor 50 can be constructed similarly to the processor 16 described above and includes a program element that operates the CPU 50A to implement the select one-way commutative function employed to generate the challenge signal 26.

In the illustrated embodiment, the processor 50 couples via a transmission path to the optional terminal element 52. The party requesting access can enter a password code at the terminal 52. The processor 50 collects the entered password and implements to the one-way function to encrypt the challenge signal 26 as an exponential function of the entered password code. As previously discussed, the preferred embodiment of the invention implements a one-way commutative function that includes an exponential-modulo function. Generally, the processor 50 implements this preferred function according to:

$$R = (C)^{Sentered} \bmod q \qquad \text{(Eq. 11)}$$

where (R) can be the response signal 28, (C) is the challenge signal 26, (Sentered) is the password code entered by the party, and (q) is the prime number signal 66. In one embodiment of the invention, the prime number signal 66 is stored in the data memory 50C of the processor 50. Alternatively, the prime number signal 66 can be transmitted via the communication channel 22, along with the challenge signal 26.

Optionally, the response signal 28 can include other information, including user names, times, and location information that can be employed by the system 10 to select one or more of the stored authentication values 60A–60D during the comparison operation. Other header information can be included with the response, or logon signal, 28 without departing from the scope of the invention.

In one preferred embodiment, the response signal 28 includes a user name signal 68 that represents the name of a system user. Preferably, the database memory element 12 is an electronically addressable memory, that stores data records that include a data field for each user name signal 68 known to the system 10 and a password field for storing the authentication value 60 associated with that user-name signal 68. Optionally the memory can include a field for a base signal, or prime number signal.

The illustrated system 10 includes a bi-directional transmission path between the communication port 18 and the processor 16. The response signal 28 received by the communication port 18 can be passed to the processor 16. The processor 16, in one embodiment, can collect the user name signal 68 from the response signal 28 and search the data memory element 12 to find the associated authentication value 60. Typically, the memory element 12 stores the authentication values. The processor operates on the authentication value 60 to generate the key signal 30. In the preferred embodiment, the processor 16 is arranged to generate the key signal 30 according to the formula.

$$K = (\text{authentication value})^a \bmod q \qquad \text{(Eq. 12)}$$

where (K) is the key signal 30, (authentication value) is the stored authentication value 60, (a) is the random number signal 32 and (q) is the prime number signal 66. As described above, the commutative property of the select one-way function provides a product that is independent of the sequence of operations. Consequently, the key signal 30 can be identical to the response signal 28 generated by the client 46.

As further illustrated by FIG. 2, the processor element 16 connects via a transmission path to the communication port 18. The communication port 18 can be an electrical circuit card assembly of the type conventionally used for interfacing a computer element with a communication channel, such as the communication channel 22. In one embodiment of the present invention the communication port 18 includes a modem for transforming electrical digital data signals into a format suitable for transmission over conventional telephone wires. Alternatively the communication port 18 can be a hard wired parallel computer interface of the type suitable for connecting a computer processing element such as host element 44 with a terminal interface such as the type as used by an ATM device. In the illustrated embodiment, the processing element 16 can include a second operating program stored in the program memory for directing the processing unit to operate the communication port 18 to transmit the challenge signal 26 via the communication channel 22 to the client element 46. The transmission of the challenge signal 26 can be responsive to an access request signal generated by the client element 46 and transmitted via the communication channel 22 and the communication port 18 to the processing element 16. However, it should be apparent to one of ordinary skill in the art, that other protocols and systems can be used for activating the transmission of the challenge signal 26 by the host element 44.

The host element 44 further includes a comparator element 24. The comparator element 24 can be an electrical circuit card assembly constructed according to well known principles of electrical engineering, for comparing two large digital data signals and for determining a substantial identity between the two compared signals. In the illustrated embodiment, the comparator element 24 connects via transmission paths to the processor element 16 and the communication port 18. As further illustrated by FIG. 2, the comparator element 24 can further connect to the optional controller unit 42.

The comparator element 24 can receive the key signal 30 generated by the processor element 16 and the response signal 28 received at the communication port 18 via the communication channel 22. The comparator element 24 compares the response signal 28 with the key signal 30 and generates a match signal 34 representative of a substantial identity between the response signal 28 and the key signal 30.

The system depicted in FIG. 2 includes an optional database memory 40 and an optional control unit 42. The control unit 42 connects via transmission paths to the comparator element 24 for receiving the match signal 34 and connects via a transmission path to the communication port 18 for transmitting data from the database memory element 40 to the communication port 18 for transmission via the communication channel 22 to the client element 46. The database memory element 40 can be an electrical circuit card assembly of the type suitable for storing electrical digital data signals and conventionally used with data processing equipment. In one practice of the present invention, the database memory element 40 stores restricted information that can be accessed only by parties that transmit to the host element 44 a password signal that is substantially identical to a password signal represented by one or more of the authentication values 60A-60D stored in data memory element 12.

The illustrated control element 42 connects to the data base memory element 40 and includes an electrical circuit card assembly of the type suited for transferring information signals between data processing equipment and a database memory. As illustrated in FIG. 2 the control element 42 connects to the comparator element 24 via a transmission path that carries the match signal 34. The control element 42 can include a processing element that activates or deactivates the control element 42 according to the activation or deactivation of the match signal 34. The control element 42 can activate or deactivate transmission of data between the communication port 18 and the database memory element 40 responsive to the match signal 34. In a preferred practice of the present invention, control element 42 can transfer data between the communication port 18 and the database memory element 40 responsive to a match signal 34 that indicates the substantial identity between a response signal 28 received from the client 46 and a key signal 30 generated by the processor element 16.

In the illustrated embodiment, the communication channel 22 carries the challenge signal 26 and the response signal 28. The communication port 18 receives the response signal 28 and transmits the response 28 via a transmission path to the comparator element 24. The comparator element 24 is connected via a transmission path to the processor element 16. The illustrated processor element 16 transmits via the transmission path the key signal 30. The comparator element 24 can compare the key signal 30 with the response signal 28 and, generate the match signal 34 as a function of the comparison of the response signal 28 and the key signal 30. In one embodiment of the present invention the match signal 34 is activated by the comparator element 24 detecting a substantial identity between the key signal 30 and the response signal 28. The illustrated random number generator 14 connects via a transmission path to the processor element 16 and transmits the random number signal 32 to the processor element 16. The illustrated processor element 16 transmits via a transmission path the challenge signal 26 to the communication port 18.

In a preferred embodiment of the present invention, the response signal 28, the key signal 30, and the challenge signal 26, are large binary signals preferably having 128, 256, 512 or more bits of information. The substantial identity between a response signal and a key signal 30 can represent that each of the bits in the sequence making up either the key signal 30 or the response signal 28 is exactly matched by the corresponding bits in the counterpart signal. In a preferred embodiment of the present invention, the communication ports 18 and 48 include error correction elements 74A and 74B that can detect transmission errors within the response signal 28 received from the client element 46. The correction elements 74A and 74B can be any of the conventional error correction or detection systems commonly used for transferring signals between two computer processing units. In one embodiment of the present invention, the error correction unit 74 includes a parity detector for detecting parity errors in the transmission of the response signal 28. Accordingly, the communication port 18 can detect transmission errors and request that the client element 46 re-send the response signal 28. As such the substantial identity between the response signal 28 and key signal 30 can represent the identity between a re-transmitted response signal 28 and a key signal 30. Alternatively the error correction element 74 can include a CRC error correction unit that can automatically correct transmission errors detected in the response signal 28. In this embodiment of the present invention, the substantial identity between the response signal 28 and the match signal 34 can represent a substantial identity between the corrected response signal 28 and the key signal 30.

Figure 3A:
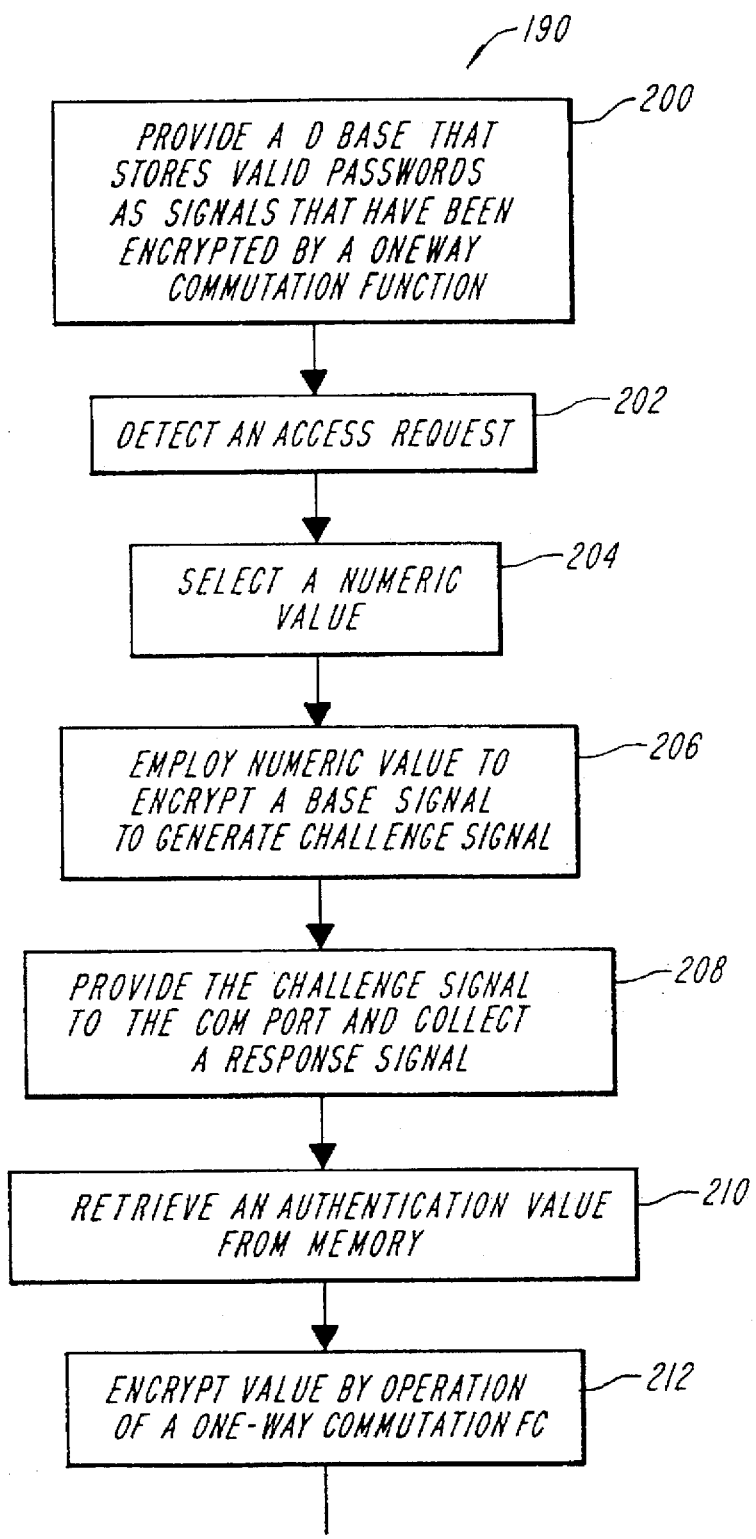
FIGS. 3A and 3B are flow chart diagrams illustrating a process in accordance with the invention which employs one-way commutative functions to encrypt passwords.
Figure 3B:
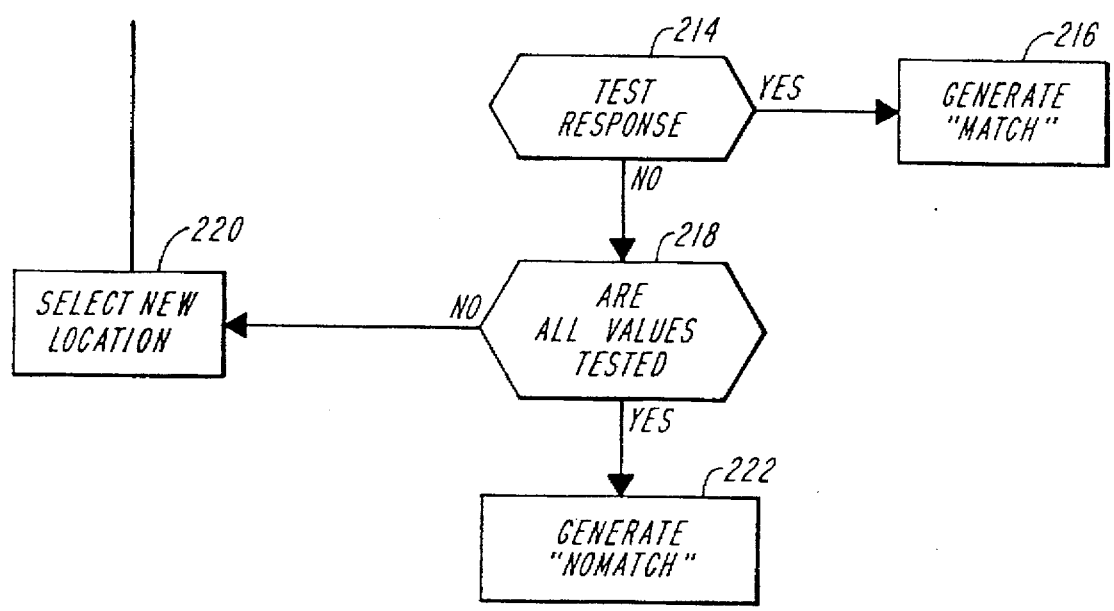

FIGS. 3A and 3B illustrate another aspect of the present invention that provides methods for operating a security system that employs passwords to verify the identity of a party requesting access to the security system. In general, the methods described herein employ the commutative property of a select one-way commutative function to directly compare two encrypted signals. In particular, the methods provide steps for generating an authentication value by encrypting a base signal with a password signal, by operating on the base and password signal with a one-way commutative function. In a subsequent series of steps, a numeric value is generated and the one-way commutative function is again employed to encrypt the authentication signal as a function of the non-repeating selected variable. The output of this second operation is generally considered to be a key signal that is infeasible to invert.

Importantly, the commutative property of the selected one-way function, ensures that the order of the operations is immaterial to the final value of the generated key signal. Consequently, the methods described herein can generate a third signal that represents the base signal encrypted with the numeric value by the one-way commutative function and can provide this third signal as a challenge to any party requesting access through the security system. The party requesting access is required to encrypt the challenge signal to generate a response signal that is to be substantially identical to the key signal. Accordingly, an authorized client that, as the term is used herein, is a party that knows a valid password, can encrypt the challenge signal with a valid password signal by employing the one-way commutative function to thereby generate a response that is identical, or substantially identical, to the key signal.

With reference again to FIG. 3A, one embodiment of a method 190 for operating a security system that employs passwords is illustrated. In a first step 200, the method provides a database that stores authentication values that typically represent valid passwords that have been encrypted by a one-way commutative function. Typically, the method 190 provides a database that stores a plurality of authentication values, or electrical signals representative of such values, and that stores the authentication values in an addressable memory element with each value stored in a separate memory register that is sequentially indexed, or indexed by client name. As further illustrated by FIG. 3, the method 190 includes a second step 202 for detecting an access request. An access request can be a signal transmitted from a party either on a terminal, remote node, network or at some other communication port, to access the restricted materials or area. Responsive to the access request, the method 190 selects, in step 204, a numeric value. Generally, the step 204 adds an element of randomness to the method 200 that requires a party requesting access through the security system to react appropriately to an unpredictable or non-repeating challenge from the security system. Any process or method for adding this element of randomness or for generating a non-repeating sequence can be practiced with the invention without departing from the scope thereof. Typically the number is a randomly selected numeric value generated by a random number generator that generates numeric values in a sufficiently random sequence to prevent the ready prediction of numeric values likely to be employed by the method 200. In the successive step 206, the process employs the randomly selected numeric value to successive step 206, the process employs the randomly selected numeric value to encrypt a base signal by operation of the one-way commutative function. As described above with reference to the systems illustrated in FIGS. 1 and 2, the commutative property of the selected function generates an output signal that can be commutated or operated on by the commutative function yet is generally understood to be infeasible to invert. Therefore, the encrypted value generated in step 206 can be provided as a challenge signal through a communication port to a party requesting access through a security system. This step, illustrated as 208 in FIG. 3, provides a challenge signal to a client that can be operated on by a one-way commutative function to generate a response signal that represents the challenge signal encrypted with an offered password signal. As further illustrated in step 208, the response signal can be transmitted by the client to the system and collected by the system for comparison with the authentication values stored in the database memory.

In one embodiment of the invention, the method can be applied to systems that employ one universal password code. In this practice the method 190 retrieves the authentication value, which represents the single encrypted password, from the database memory. In a subsequent step 212, the retrieved signal is operated on by the one-way commutative function as a function of the numeric value selected in step 204 to generate a key signal. The method 190 compares the key signal with the response signal. If the response signal is identical to the key signal, the method declares the party requesting access as an authorized client. Alternatively if the response signal fails to match the key signal, the party requesting access is declared an unauthorized user and denied access.

In an optional practice of the present invention, as also illustrated in FIG. 3, a database memory is provided that stores multiple authentication values, each of which represents a valid password signal each separately encrypted by the selected one-way commutative function. In this practice the response signal collected in step 208 is stored in a memory element and each authentication value stored in the database memory is retrieved from the memory and encrypted as a function of the selected non-repeating numeric value to generate a test signal. Each test signal is compared to the offered response signal. As illustrated in FIG. 3, step 214 compares each test signal with the offered response signal. If a match is identified, step 216 generates a match signal indicating that the party requesting access is an authorized client. Alternatively, as illustrated by step 218, if the test signal fails to match the response signal, the method 190 determines if all the authentication values stored in the database memory have been compared with the response. If the database memory element contains values that have not been tested, the step 220 selects a new authentication value from the database memory element for comparison with the response signal. Alternatively, if step 218 determines that all the authentication values have been tested against the response, the process in step 222 generates a "no match" signal indicating that the offered response signal fails to match any of the authentication values and therefore the party requesting access is declared an unauthorized user and denied access.

Other modifications can be made to the present method for implementing methods that correspond to the systems described above with reference to FIGS. 1 and 2. The modifications can include adding a step for randomizing a password signal selected by a user, or for digesting the response signal and the key signal being compared. Other modifications can include adding steps for generating separate base signals or prime number signals for each authentication value, or for a series of authentication values.

The invention has been described above with reference to certain illustrated embodiments and practices. The description of the illustrated embodiments and practices provides a more fuller understanding of the invention; however, the invention is not to be limited to the illustrated embodiments and practices of the description thereof and the invention is to be interpreted according to claims set forth herein.

Having described the invention what is claimed as new and secured by Letters Patent is:

1. Digital logic apparatus for verifying a party, comprising
   a memory element for storing an authentication value representative of a password encoded by operation of a one-way commutative function of a base signal representative of a numeric value,
   a number generator for generating a number signal,
   a processor element coupled to said number generator and to said memory element for generating a key signal representative of said authentication value encoded by operation of said one-way commutative function of said number signal and for generating a challenge signal representative of said number signal encoded by operation of said one-way commutative function of said base signal,
   a communication element for transmitting said challenge signal to said party and for receiving a response signal from said party, and
   a comparator element for comparing said response signal with said key signal and for generating a match signal representative of a substantial identity between said key signal and said response signal.

2. Apparatus according to claim 1 wherein said processor element includes means for performing a one-way commutative exponential function modulo a prime number.

3. Apparatus according to claim 1 wherein said number generator includes a random number generator element for generating a sequence of random numbers.

4. Apparatus according to claim 1 wherein said number generator includes a non-repeating number generator element for generating a sequence of non-repeating numbers.

5. Apparatus according to claim 1 wherein said communication port includes error correction means for encoding said challenge signal and decoding said response signal to detect and correct errors that occur in said signals during the transfer of signals between said apparatus and said party.

6. Apparatus according to claim 1 further comprising means for generating said base signal.

7. Apparatus according to claim 1 wherein said memory element includes means for storing said base signal.

8. Apparatus according to claim 1 further comprising means for generating a prime number signal.

9. Apparatus according to claim 1 wherein said memory element includes means for storing a prime number signal.

10. Apparatus according to claim 1 further comprising means for generating a randomized password signal, including means for storing a randomizing factor, means for storing a user selected password signal, and processor means for digesting said user selected password signal with said randomizing factor for generating said randomized password signal.

11. Apparatus according to claim 1 further comprising digest processor means adapted for digesting said key signal to generated an encrypted key signal.

12. Apparatus according to claim 11 wherein said digest processor means is adapted for implementing an MD5 encryption process.

13. Apparatus for transmitting a secure password signal over a public communication channel, comprising a server element having a memory element having storage for an authentication value signal representative of said password signal encoded according to a one-way commutative function, a non-repeating number generator having an output means and arranged for providing a non-repeating number signal at said output means, processor element arranged for processing signals according to a one-way commutative function, and coupled to said non-repeating number generator and to said memory element for generating a key signal representative of said authentication value encoded as a one-way commutative function of said non-repeating number signal and for generating a challenge signal representative of numeric value encoded as a one-way commutative function of said non-repeating number, a communication port, interfaced to the communication channel, for transmitting said challenge signal and for receiving a response signal, and a comparator element for comparing said key signal with said response signal and for generating a match signal representative of a substantial identity between said key signal and said response signal, a client element having a communication port, interfaced to the communication channel, for receiving said challenge signal and for transmitting said response signal, and processor element arranged for processing signals according to a one-way commutative function, and coupled to said communication port for generating said response signal as a one-way commutative function of said challenge signal, and said password signal.

14. Apparatus according to claim 13 wherein said server processor element and said client processor element each includes means for generating a signal according to an exponential function modulo a prime number.

15. Apparatus according to claim 13 wherein said memory element has storage for a plurality of authentication values, each representative of encrypted password signals, and said processor means is arranged for processing said plurality of authentication values to generate plural key signals and has output means for transmitting each of said key signals to said comparator element for comparison with said response signal for detecting one of said plural key signals substantially identical to said response signal.

16. Apparatus according to claim 13 wherein said client element further includes a terminal element interfaced with said client processor means and arranged for inputting said password signal to said client processor means.

17. Apparatus according to claim 13 further including a secure database memory element arranged for storing information and having a controller unit coupled to said comparator element for receiving said match signal and for transferring data between said database memory element and said host communication port responsive to said match signal.

18. Apparatus according to claim 13 further including means for generating a randomized password signal, including means for storing a randomizing factor, means for storing a user selected password signal, and processor means for digesting said user selected password signal with said randomizing factor for generating said randomized password signal.

19. Apparatus according to claim 13 wherein said server element further comprises digest processor means adapted for digesting said key signal to generated an encrypted key signal.

20. Apparatus according to claim 13 wherein said client element further comprises digest processor means adapted for digesting said response signal to generated an encrypted response signal.

21. Method for transmitting a password over a communication channel, said method comprising the steps of providing a memory element for storing an authentication value signal representative of said password encoded according to a one-way commutative function, generating a non-repeating number signal, generating, according to said one-way commutative function, a key signal representative of said authentication value encoded as a one-way commutative function of said non-repeating number signal, and a challenge signal representative of a numeric value encoded as a one-way commutative function of said non-repeating number signal, transmitting said challenge signal to a client requesting access to a secure system and receiving a response signal from said client, and comparing said response signal with said key signal to generate a match signal representative of a substantial identity between said response signal and said key signal.

22. Method according to claim 21 wherein said step of generating a challenge signal includes the step of generating said challenge signal as a one-way commutative function of said numeric value and said non-repeating number signal.

23. Method according to claim 21 wherein said step of providing a memory element adapted to store an authentication value signal includes the step of providing a memory element having a plurality of said authentication value signals, and generating plural key signals as a one-way commutative function of said plural authentication value signals and said non-repeating number signal.

24. Method according to claim 21 including the further step of accessing data stored in a secure database responsive to said match signal and transferring data between said database and said client.

25. Apparatus for responding to a challenge signal transmitted over a communication, comprising memory element adapted to store a signal representative of a password signal, a communication port adapted to interface to the communication channel, for transmitting a response signal, and processor element arranged for processing signals according to a one-way commutative function, and coupled to said communication port for generating said response signal as a one-way commutative function of said challenge signal, and said password signal.

26. Method for responding to a challenge signal transmitted over a communication channel, comprising the steps of storing in a memory element, a signal representative of a password signal, providing a communication port adapted to interface to the communication channel, for transmitting a response signal, generating said response signal processor element as a one-way commutative function of said challenge signal, and said password signal, and transmitting said response signal via said communication port.

27. Apparatus for verifying the identity of a client having a password, said apparatus comprising a memory element for storing an authentication value, said authentication value being formed by application of a one-way commutative function to a base signal, and to said password, a processor element configured for generating a challenge signal by application of said one-way commutative function to said base signal and to a number signal, and a comparator element for comparing a return signal generated by said client, said return signal being generated by application of said one way commutative function to said challenge signal and to said password.

28. Method for verifying the identity of a client having a password, said method comprising the steps of storing an authentication value, said authentication value being formed by application of a one-way commutative function to a base signal and to said password, generating a challenge signal by application of said one-way commutative function to said base signal and to a number signal, and comparing a return signal generated by said client, said return signal being generated by application of said one way commutative function to said challenge signal and to said password.

* * * * *